(12) United States Patent
Bear et al.

(10) Patent No.: US 10,380,269 B2
(45) Date of Patent: Aug. 13, 2019

(54) SIDEWAYS INFORMATION PASSING

(75) Inventors: Chuck Bear, Hudson, MA (US);
Lakshmikant Shrinivas, Billerica, MA (US); Andrew Lamb, Arlington, MA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 1033 days.

(21) Appl. No.: 13/155,232

(22) Filed: Jun. 7, 2011

(65) Prior Publication Data
US 2012/0317094 A1    Dec. 13, 2012

(51) Int. Cl.
*G06F 17/30*    (2006.01)
(52) U.S. Cl.
CPC .. *G06F 17/30463* (2013.01); *G06F 17/30595* (2013.01)
(58) Field of Classification Search
CPC ......... G06F 17/30595; G06F 17/30463; G06F 17/30498
USPC ........................................................ 707/714
See application file for complete search history.

(56) References Cited

U.S. PATENT DOCUMENTS

| | | | |
|---|---|---|---|
| 2004/0193593 A1* | 9/2004 | Sacco | G06F 17/30643 |
| 2008/0033914 A1* | 2/2008 | Cherniack et al. | 707/3 |
| 2010/0082600 A1* | 4/2010 | Xu et al. | 707/714 |
| 2010/0088309 A1* | 4/2010 | Petculescu et al. | 707/714 |
| 2010/0153429 A1* | 6/2010 | Xu | G06F 17/30418 707/769 |
| 2011/0184933 A1* | 7/2011 | Colby | G06F 17/30498 707/714 |

FOREIGN PATENT DOCUMENTS

| WO | WO-2009009556 A1 | 1/2009 |
|---|---|---|
| WO | WO-2010039898 A2 | 4/2010 |

OTHER PUBLICATIONS

Abadi, Daniel J.; "Intergrating Compression and Execution in Column-Oriented Database Systems"; Jun. 27, 2006; XP040042476; 12 pages.
PCT; "Notification of Transmittal of the International Search Report and the Written Opinion of the International Searching Authority, or the Declaration"; PCT/US2011/045901 dated Jan. 31, 2012; 12 pages.

* cited by examiner

*Primary Examiner* — Van H Oberly

(57) ABSTRACT

Methods, systems and program products for query optimization using sideways information passing. In one implementation, a join clause in a query is identified that specifies an outer table of tuples to be joined with an inner table, the outer table having one or more attributes, and each of the attributes of the outer table having values stored in an attribute file that is distinct from attribute files in which the values of other attributes are stored. A plan for the query is created which, when executed, causes selection of a subset of tuples of the outer table to serve as input to the join clause in place of the outer table based on one or more predicates applied to the inner table.

18 Claims, 11 Drawing Sheets

SIDEWAYS INFORMATION PASSING

BACKGROUND

The present disclosure relates to digital data processing and, in particular, to database query optimization using sideways information passing.

Structured query language (SQL) is a computer language based on relational algebra that is used for querying and managing data in relational database management systems. A relational database management system (RDBMS) is a database system based on a relational model where data is organized into tables and relationships among tables are maintained. Data in a RDBMS can be compressed to reduce its storage space. Sideways information passing (SIP) is a technique for improving the performance of early materialized SQL join clauses by filtering out unneeded data as early as possible in the analysis.

SUMMARY

In general, one aspect of the subject matter described in this specification can be embodied in methods that include the actions of identifying a join clause in a query, the join clause specifying an outer table of tuples, to be joined with an inner table, the outer table having one or more attributes, each of the attributes of the outer table having values stored in an attribute file that is distinct from attribute files in which the values of other attributes are stored; and including, in a plan for the query, a filter that, when executed, causes selection of a proper subset of tuples of the outer table to serve as input to the join clause in place of the outer table, in which selection of the tuples comprises reading a plurality of portions of an attribute file for one of the attributes without reading other portions of the attribute file and identifying attribute values in the read portions that satisfy one or more predicates applied to the inner table. Other embodiments of this aspect include corresponding systems, apparatus, and computer programs.

These and other aspects can optionally include one or more of the following features. A resource can be a video. A first portion can include a first attribute value that represents a repeated attribute value. A determination that the first attribute value satisfies one or more of the predicates suffices for the identical attribute values. The first attribute value comprises a run-length encoded attribute value. Selection of the tuples uses a bloom filter. The predicates are specified by the join clause. The join clause can include one or more additional predicates applied to the outer or inner table. Thee join clause can comprise an inner join or a right outer join. In which selection of the tuples uses a hash table or a bloom filter. The inner table can have one or more attributes each of which having values stored in an attribute file that is distinct from attribute files in which the values of other attributes of the inner table are stored. Values in an inner table or outer table attribute file can be stored in a sorted order. An inner table or outer table attribute file can be divided across nodes.

In general, one aspect of the subject matter described in this specification can be embodied in methods that include the actions of identifying a merge-join clause in a query that specifies an outer table of tuples to be joined with an inner table of tuples, the merge-join clause including an equality predicate equating a first attribute of the outer table to a second attribute of the inner table, the first and second attributes having values stored in respective sorted orders in respective attribute files; including, in a plan for the query, a filter, that when executed, causes selection of a proper subset of tuples of the outer table to serve as input to the merge-join clause in place of the outer table, in which selection of the tuples comprises: creating a hash table on second attribute values for a plurality of inner table tuples that satisfy one or more predicates applied to the inner table; determining a minimum and a maximum value of the respective second attribute values for the plurality of inner table tuples; and beginning with a tuple in the outer table that has a first attribute value that is equal to the determined minimum, selecting one or more tuples of the outer table that have respective first attribute values that are less than the determined maximum value and that are in the hash table. Other embodiments of this aspect include corresponding systems, apparatus, and computer programs.

These and other aspects can optionally include one or more of the following features. A resource can be a video. The beginning tuple in the outer table can be located using a binary search of the respective attribute file. One or more tuples of the outer table can be selected that have respective first attribute values that are greater than the determined maximum value. The selected tuples of the outer table have respective first attribute values that are greater than or equal to the determined minimum value. A respective attribute file is divided across nodes. The first attribute values are run-length encoded.

Particular aspects of the subject matter described in this specification can be implemented to realize one or more of the following advantages. SIP is combined with traits of the physical storage format such as column orientation, compression, and sorting, to reduce the data retrieval (input/output and caching) costs, while also reducing computation required to perform data analysis. Column orientation allows a subset of a table's attribute values to be retrieved from storage without the overhead of retrieving other attributes. Compression, such as run length encoding, allows large numbers of rows to be treated with computational resources comparable to those required for processing a single row. Sorting, which locates related rows together in persistent storage to increase compressibility, reduces the computational resources required to locate and process rows.

The details of one or more embodiments are set forth in the accompanying drawings and the description below. Other features, aspects, and advantages will become apparent from the description, the drawings, and the claims.

DETAILED DESCRIPTION

In various implementations, the techniques described in this specification can be applied to queries having inner joins or right outer joins. The result of an inner join is the combination of the column values (or "attribute values") of two tables (outer and inner) based upon a search condition specified in a query. A search condition includes one or more predicates. A predicate is a Boolean expression that evaluates to true, false or unknown. Each row (or "tuple") of the outer table is tested with each tuple of the inner table to find all pairs of tuples that satisfy the search condition of the inner join. For example, if tuple T1 of the outer table and tuple T2 of the inner table satisfy the search condition, the attribute values of both tuples are combined to form a new tuple T3 which is included in the output of the inner join.

In the case of a right outer join, each tuple T1 of the inner table is tested with each tuple T2 of the outer table to find all pairs of tuples that satisfy the search condition. The attribute values of each pair that satisfies the search condition are combined to form a new tuple T3 which is included in the output of the right outer join. If, for a given tuple T1 of the inner table, there is no tuple of the outer table that satisfies the search condition, a new tuple is generated that is included in the output of the right outer join with the attribute values of T1 and NULLs in place of the attribute values of the outer table.

Figure 1:
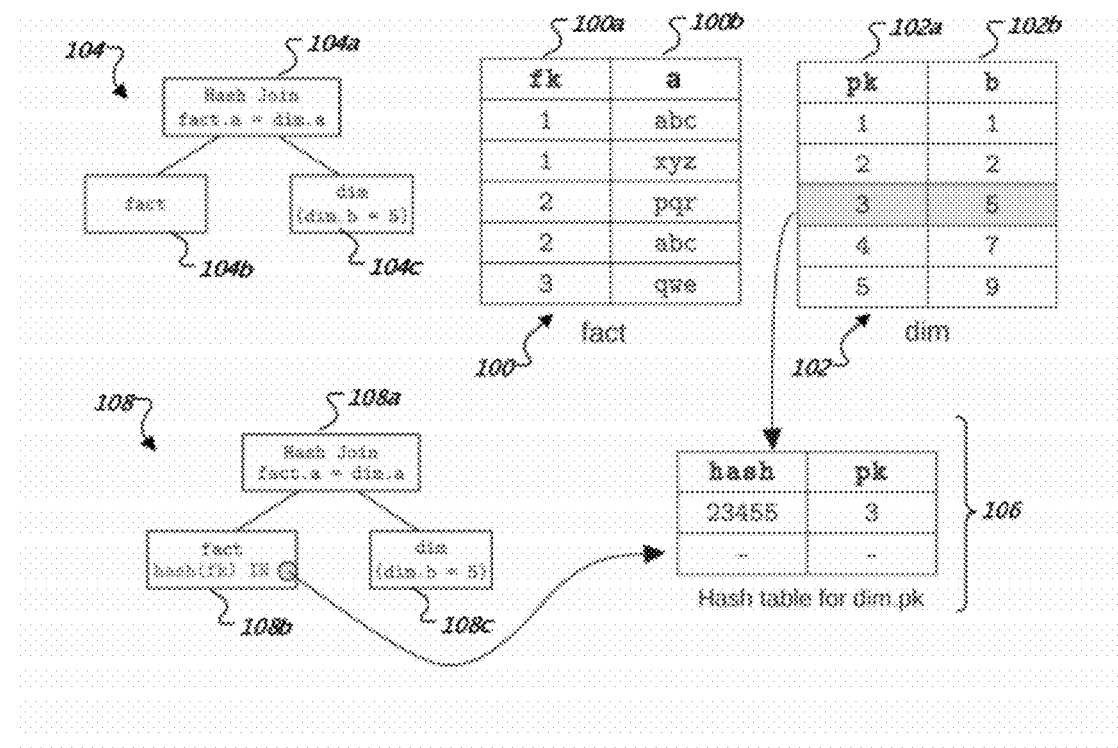
FIG. 1 is an illustration of sideways information passing for an inner join of two tables of an example SQL query.

FIG. 1 is an illustration of sideways information passing for an inner join of two tables in an example SQL query:

```
SELECT * FROM fact HASH JOIN dim
    ON fact.a = dim.b AND dim.b = 5;
```

The above hash join operation is an inner join operation that is implemented with a hash table. For example, a hash table can be created by applying a hash function to the join attribute values of each tuple of the inner table which is the table specified on the right-hand side of the join clause. Then, the outer table (specified on the left-hand side of the join clause) can be scanned to find relevant tuples that satisfy the search condition by looking in the hash table. The search condition in this example is "fact.a=dim.b AND dim.b=5".

In various implementations, a query can be represented as a directed acyclic graph (DAG) or other data structure. A query plan can be generated from the DAG. A query plan is an ordered set of steps used to access or modify information in the RDBMS. By way of illustration, the DAG 104 is a representation of the preceding SQL query. Node 104a of the DAG 104 represents the "hash join" operation and the portion of the search condition (e.g., "fact.a=dim.a") that joins the two tables: outer table fact 100 and inner table dim 102. The outer table 100 has two attributes: "fk" 100a and "a" 100b. Attribute 100a is a foreign key which represents the primary key 102a of the inner table 102. The outer table 100 is represented as node 104b and the inner table 102 is represented by node 104c in the DAG 104. Node 104c specifies that the tuples of the dim table 102 must satisfy the predicate "dim.b=5". Without SIP, the input to the hash join operation 104a in a resulting query plan would include every tuple in the fact table 100.

DAG 108 represents the preceding query and takes advantage of SIP to reduce the number of tuples that are input to the join operation. A benefit of a column store databases is late materialized joins—i.e., the ability to fetch post join columns for those tuples of the table that pass the search condition. (Column storage is further described below with reference to FIG. 2.) Generally speaking, a join clause acts as a filter to prevent some of the tuples of a table from being provided to a join operation. For joins that are very selective the savings provided by late materialization can be significant. SIP allows the benefit of late materialization in early materialized joins by applying a filter early by passing information from the inner join input (e.g., node 108c) to the outer join input (e.g., node 108b), thus allowing the ability to avoid fetching tuples for which the search condition (e.g., "fact.a=dim.a") would evaluate to false.

By way of illustration, nodes of the DAG 108 are the same as those of the DAG 104 except that node 108b, which represents the outer table fact 100, specifies a SIP filter:

```
hash(fk) IN <hash table 106>
```

The "IN" predicate checks if a particular value appears in a sideways information passing information data structure 106 (which in this case is a hash table) and returns TRUE if so, otherwise FALSE. When executed as part of a query plan, the SIP filter operates to filter out tuples from the fact table 100 that would not satisfy the search condition (e.g., "fact.a=dim.a"). Before execution of the join operation in the query plan for the DAG 108, the sideways information passing data structure 106 is generated on the primary key 102a values of the inner table 102 for only those primary keys that correspond to values of attribute 'b' 102b that are equal to the value 5. The SIP filter for node 108b checks that for each tuple in the outer table 100, the tuple's foreign key value 100a is in the sideways information passing data structure 106. If not, the tuple is not provided as input to the join operation represented by node 108. Other types of SIP filters can be used instead of the illustrated hash filter such as, for example, bloom filters and magic sets.

In various implementations, the values for each attribute of a table are stored in an electronic file that is separate from files storing values of the other attributes of the table. That is, each column of a table is stored in a separate file in the RDBMS. The attribute values in each file are also physically stored in a sorted order. Having separate files for each column makes it possible to store some of a table's columns in one sort order and others in a different sort order.

Figure 2:
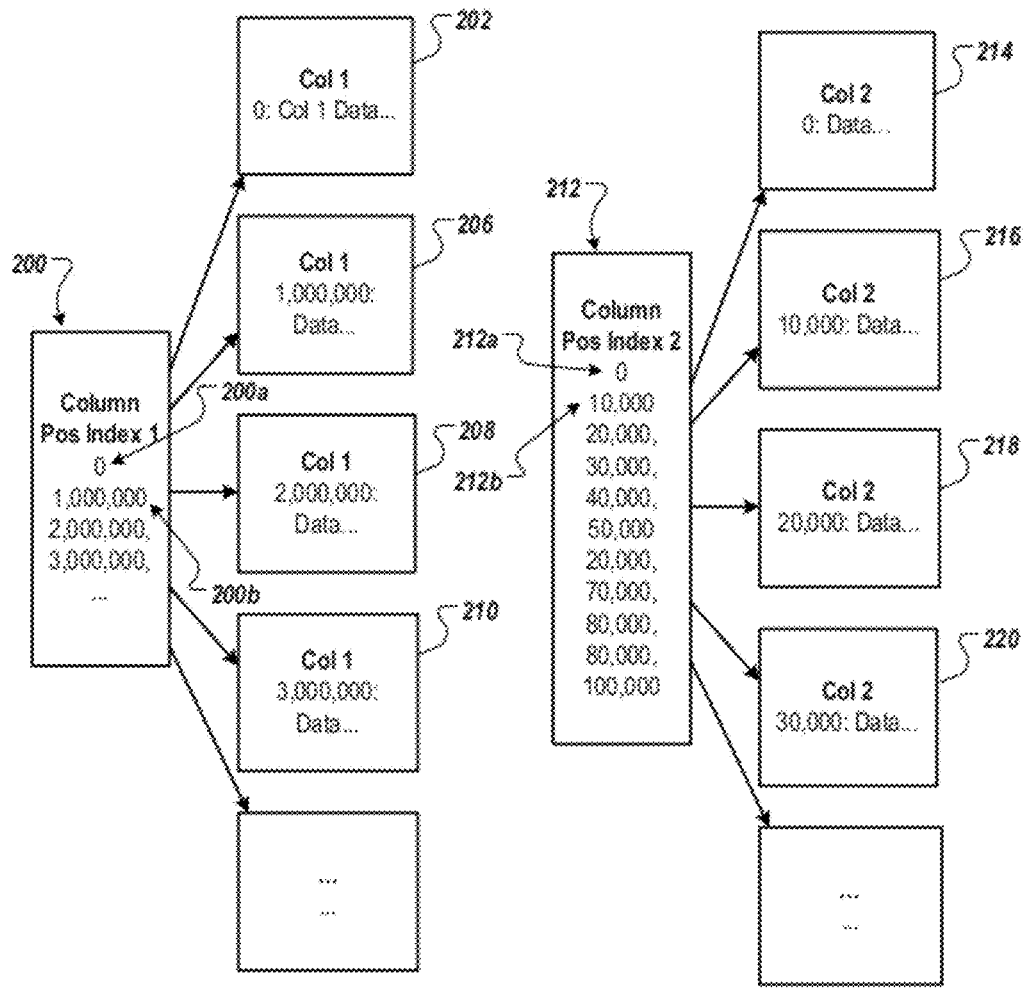
FIG. 2 illustrates example indexes for column containers.

FIG. 2 illustrates example indexes for attribute containers. A container stores one or more attributes for a set of tuples of a projection. An index is a position index used to tie data, i.e., attribute values, from different attributes together. By way of illustration, the position index 200 includes entries for one or more blocks. In a container, each attribute's data is stored according to a sort order in a separate file as a sequence of blocks and each file has its own index. In this example, Column 1's data is stored in blocks 202, 206, 208 and 210, and these blocks are indexed by index 200. (There is an implicit position number associated with each attribute value.) An index stores ranges: entries relating the starting position number and a file offset of a block containing the data for the position. For example, index entry 200a indicates that positions 0 through 999,999 for Column 1 are stored in block 202, entry 200b indicates that positions 1,000,000 through 1,999,999 are stored in block 206, and so on.

Likewise attribute Column 2's data is stored in blocks 214, 216, 218 and 220, and these blocks are indexed by index 212. Index entry 212*a* indicates that positions 0 through 9,999 for Column 2 are stored in block 214, entry 212*b* indicates that positions 10,000 through 19,999 are stored in block 216, and so on. In order to access position 645 of Column 2, for example, the index 212 is first checked to determine the offset of the block that contains the position. Index entry 212*a* indicates that block 214 contains position 645. Block 214 is then scanned to locate the position data within the block. Note that if only Column 2's data is needed for a query, then neither the index nor the blocks for Column 1 are touched. All attribute values for a specific tuple in a table can be retrieved by looking up each attribute's position index in turn—thus the position indexes serve to connect different attributes across multiple files. Other block indexes are possible.

Filters used to implement SIP can take advantage of this storage format by using the index range values to avoid reading blocks of the outer table that do not contain attribute values that are needed to evaluate the filter. For example, if the SIP filter needed to check for the existence of particular attribute values in an attribute file, the SIP filter could make use of the index range and the sort order of values in the attribute file in order to avoid reading portions of the attribute file that would not contain the given attribute values. By way of illustration, a binary search can be used on a sorted column to avoid fetching unnecessary blocks. This can work with a sideways information passing data structure that contains a list of all the join keys from the inner table (e.g., rather than the structure 106 of FIG. 1 which is a hash table). With such a list a binary search algorithm can be used on a sorted column—e.g., fetch the first, middle and last values of the column fk. Suppose the first value is 0, the middle value is 500, and last value is 1000. Then, since "fact.fk IN (5)" can never be true between the mid to last range (since "fk" values there are between 500 and 1000), the entire range can be skipped. No more blocks are fetched from that range. This process can be repeated recursively for the range first-mid (i.e., 0-500 of the fk column).

In some implementations, attribute values in an attribute file can be compressed using Run Length Encoding (RLE) which replaces sequences (runs) of identical attribute values with a single pair that contains the attribute value and the number of occurrences in the run. Attribute value runs are more likely since attribute files are physically stored in a sorted order. In some implementations, a SIP filter can treat a sequence of repeating attributes values as indicated by an RLE pair as though it were a single attribute value. This can reduce the amount of time a SIP filter needs to process an attribute's values.

Figure 3:
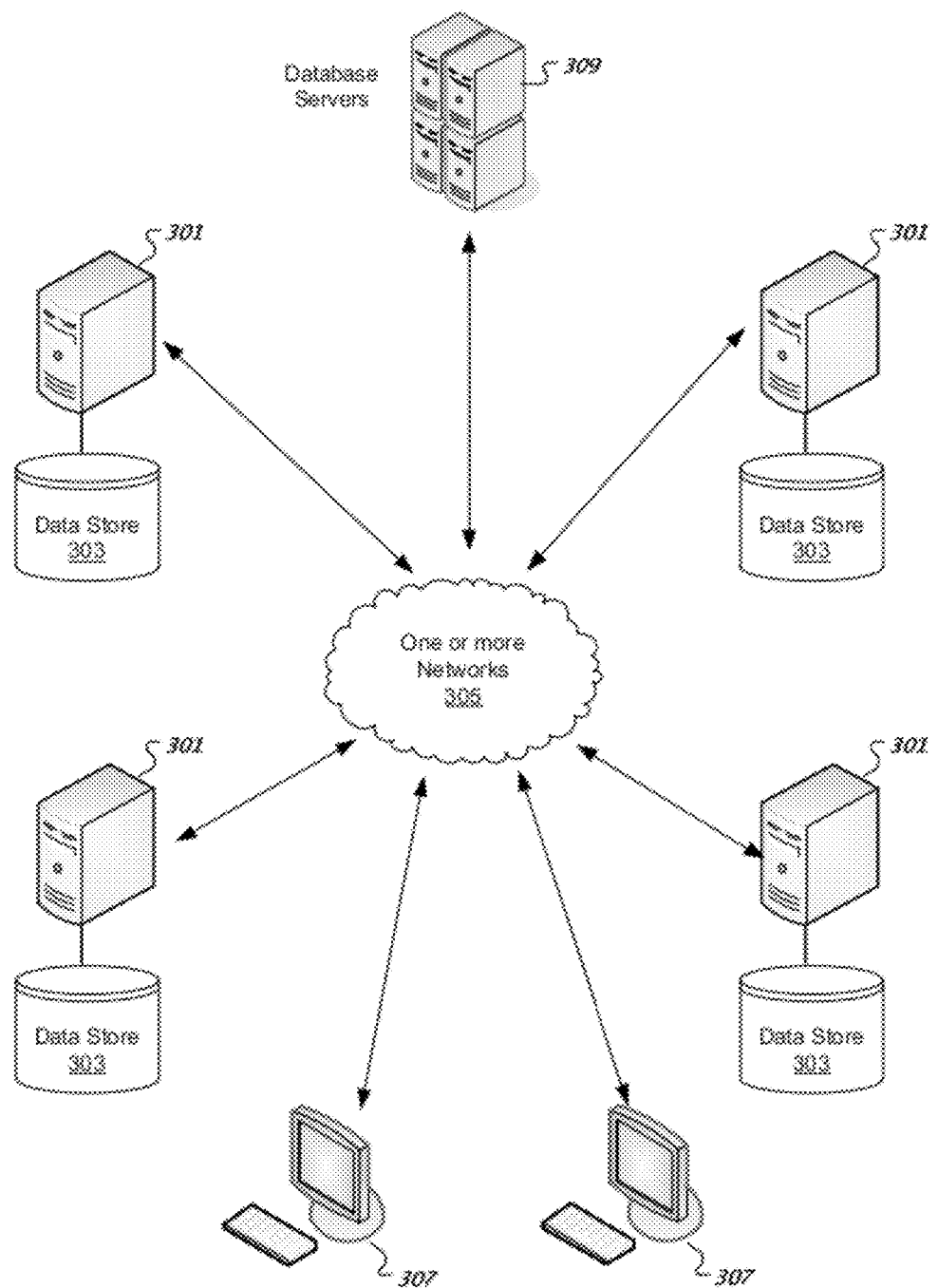
FIG. 3 is a schematic diagram of an example relational database management system.

FIG. 3 is a schematic diagram of an example RDMBS. The RDMBS includes one or more database servers 309 (e.g., data processing apparatus) accessible through one or more computer networks 305 for optimizing database queries, producing query execution plans, executing query plans, archiving database transactions, and providing a recovery process to restore data in the database when there is a database crash or hardware malfunction. The database servers 309 also include software applications that implement the RDMBS which are described below. Other functionality for the database servers 309 is possible.

Storage nodes 301 are data processing apparatus that act as storage devices for data stored in the RDBMS. Any number of storage nodes can be used with the RDBMS. Each storage node 301 has access to a local or a non-local data storage device 303 (e.g., a mass storage device) for storing and retrieving data. For example, a database table's data can be distributed to one or more of the storage nodes 301 which are accessible through the computer networks 305. In such implementations, a SIP filter can be executed in parallel on each node that contains attribute files needed by the SIP filter. For example, and with reference to FIG. 2, some of Column 2's data blocks can be stored in an attribute file on one storage node and the other data blocks can be stored in an attribute file on a different storage node. The position index 212 can likewise be split between the two storage nodes.

In some implementations, storage nodes are used to store redundant versions of data such so that the data can be recovered by the application servers 309 so long as no more than a predetermined number of storage nodes are down, for example.

In general, users interact with terminal equipment 307 such as a keyboard and an display coupled to a storage node 301, or to another computer, to submit queries to the database servers 309. In response, the database servers 309 optimize the queries, generate respective query execution plans, carry out the execution plans against the storage nodes 301, and provide results to the terminal equipment 307.

Figure 4:
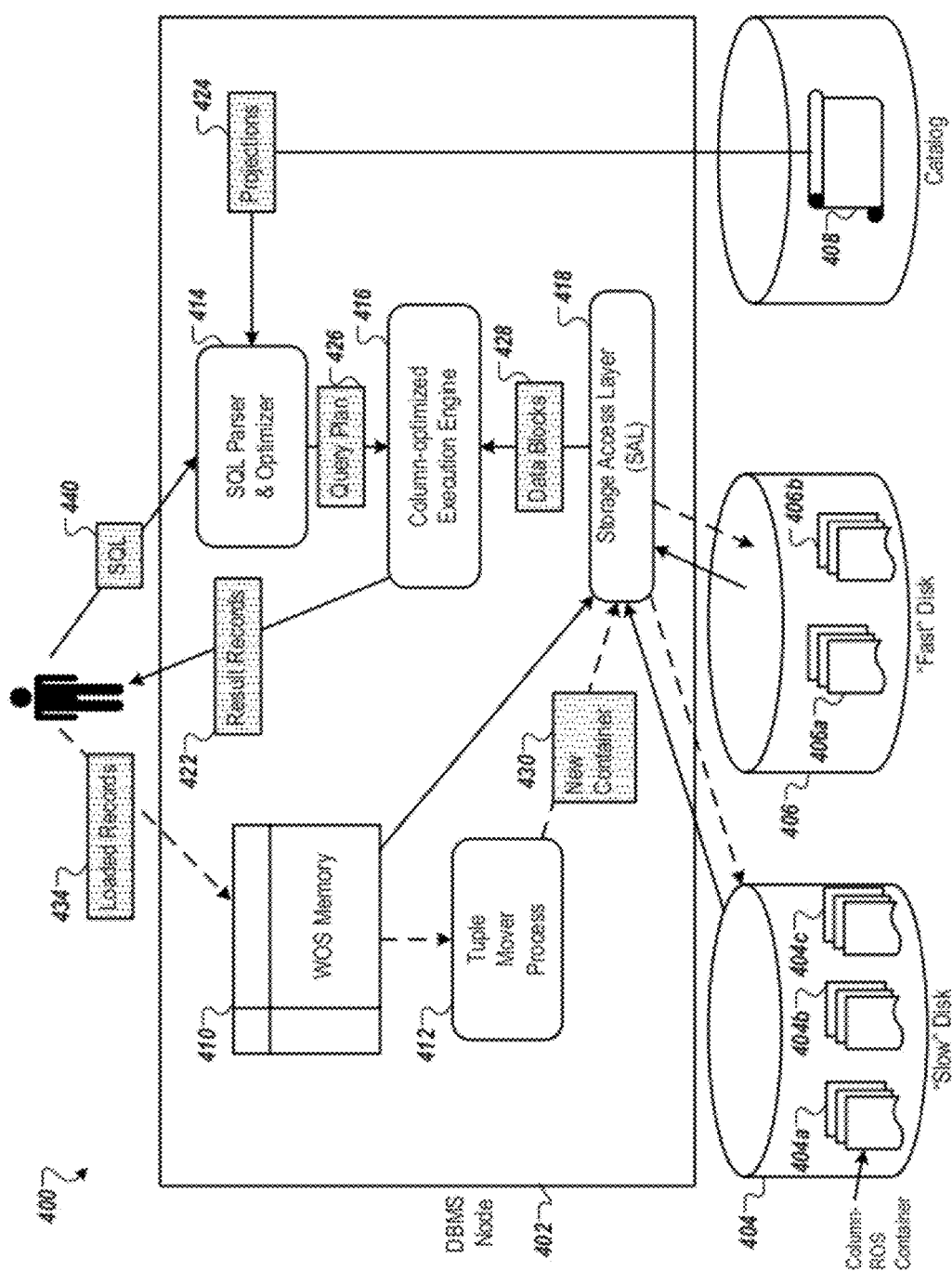
FIG. 4 is a schematic diagram of an example column store system.

FIG. 4 is a schematic diagram of an example column store system 400. The database software executes on one or more data processing apparatus, referred to as a nodes (e.g., 402). By way of illustration, a data processing apparatus comprises one or more personal computers or workstations, rack-mounted computers, or special-purpose computers, for instance. Data for a table is physically stored in one or more projections that comprise subsets of columns from the table. A projection is a sets of columns from one or more tables that are sorted on the same sort order. The node 402 can communicate with one or more storage devices for storing and retrieving data such as disk drives 404 and 406 and an in-memory, write-optimized store (WOS) 410 which stores data that is not yet written to disk. The WOS 410 acts as a cache. In some implementations, the node 402 includes a WOS 410 for each projection.

Projections are stored on disk in a read-optimized store (ROS). The ROS comprises of one or more containers. Data can be moved out of the WOS 410 to one or more containers periodically or if the data exceeds a certain configurable age or size threshold, for example. A container stores one or more columns for a set of rows of a projection in column format (e.g., 404*a-c*). Other storage formats are possible. In column format, a given column's data can be retrieved from a container separately from other columns' data. In further implementations, empirical performance data and other performance related information about disks can be used to intelligently place containers in order to achieve better performance. By way of illustration, a disk 404 having slow access times and a large amount of storage space holds information from containers 404*a-c* whereas a small disk 406 with faster throughput rates stores containers 406*a-b*.

The system 400 illustrates two common operations performed on a database: a query (e.g., a SQL query) and a data load. An background process known as the Tuple Mover 412 is responsible for migrating data from the WOS 410 to containers (e.g., 404*a-c*) and for merging ROS containers. The hatched arrows illustrate the direction of processing and data flow during a data load. Data records 434 are loaded into the WOS 410 and eventually the Tuple Mover 412, will sort, compress and encode the data into a container 430. In some implementations, the Tuple Mover 412 will also select an appropriate disk location to use to store each container.

The solid arrows illustrate the progress of a query 440 and the direction of data flow during a query processing. An end-user or an executing software program submits the query 440 to the system 400. The query 440 is parsed by a SQL parser and provided to a query optimizer 414 which chooses the best projection(s) 424 for the query by referencing the catalog 408 of projections.

A resulting query plan 426 is provided to an execution engine 416 which interacts with a Storage Access Layer (SAL) 418 to retrieve the data 428 responsive to the query 440 from the WOS 410 or the container, or both, and processes the data, before returning result records 422 back to the end user. The SAL 418 provides read and write access to WOS 410 and container storage. In some implementations, the execution engine 416 is a column-optimized engine designed to process data 428 in columns rather than in a row-by-row fashion. In yet further implementations, the execution engine 416 is capable of processing data 428 in its encoded form without first decoding the data.

The optimizer 414 adds one or more SIP filters to a DAG representation of the query 440 that will be included in the query plan 426 to be executed by the execution engine 416. In various implementations, the optimizer 414 adds zero or more SIP filters to join clauses of the DAG, depending on the type of the join. For an inner join or a right outer join of the form:

---
OuterExpr1=InnerExpr1 AND ... OuterExprn=InnerExprn,
--- n+1 SIP filters are created—one for each OuterExpr ($1<=k<=n$) and for the combined set (OuterExpr1, ... OuterExprn).

By way of illustration, assume there is a join between two tables "fact" and "dim":

---
"fact.a1=dim.b1 AND fact.a2=dim.b2 AND fact.a3=dim.b3".
---

Then, OuterExpr1,2,3 are a1, a2, a3, respectively, and InnerExpr1,2,3 are b1, b2, b3, respectively. The optimizer 414 creates four SIP filters—one each for a1, a2, and a3, and one for the combination (a1, a2, a3). These SIP filters represent the following predicates:

fact.a1 IN (some structure S1 like item 106 in FIG. 1)
fact.a2 IN (some structure S2 like item 106 in FIG. 1)
fact.a3 IN (some structure S3 like item 106 in FIG. 1)
(fact.a1, fact.a2, fact.a3) IN (some structure S4 like item 106 in FIG. 1)

These SIP filters are then added to the root of a DAG representation of the query and pushed down while maintaining correctness. (Maintaining correctness is described further below.) Depending on how much memory is available for execution of the join operator, in some implementations fewer than all of the structures S1-S4 described above will be created. For example, if there is enough of memory so that the entire hash table of the "dim" table fits in memory, then only S4 will be created. If there is not enough memory for S4 fit in memory but, for example, all the values of the column "dim.b2" fit in memory (in a list or Bloom filter), then only structure S2 needs to be created for the join operator. Note that for hash joins, the entire inner input is processed before the first tuple of the outer input is fetched. Hence, by the time the execution engine 416 is ready to start scanning the "fact" table, it has already built up one of the structures S1-S4. For example, assume that structure S2 was created. Then, when the scan on the "fact" table starts, it will apply the predicate "fact.a2 IN S2". This works in a similar way to that shown in FIG. 1 (for the predicate "hash(fk) in structure 106").

Figure 5A:
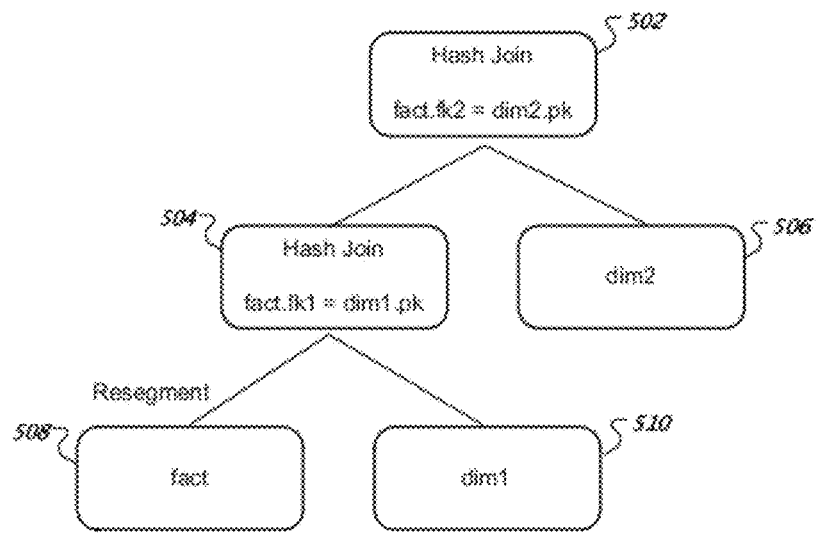
FIGS. 5A-5C illustrate example SIP filter placement.

Once SIP filters have been created for a query, they are added to the root of a DAG representation of the query and are pushed down as far as possible in the DAG while maintaining correctness. By way of illustration, consider the DAG shown in FIG. 5A. The DAG includes two hash join operators: 502 and 504. The join operator 504 is for the search condition "fact.fk1=dim1.$pk$" and has an outer input 508 representing a scan of the "fact" table and an inner input 510 representing a scan of the "dim1" table. The join operator 502 is for the search condition "fact.fk2=dim2.$pk$" and has an outer input which is the output of the join operator 504. The inner input 506 to join operator 502 represents a scan of table "dim2".

Figure 5B:
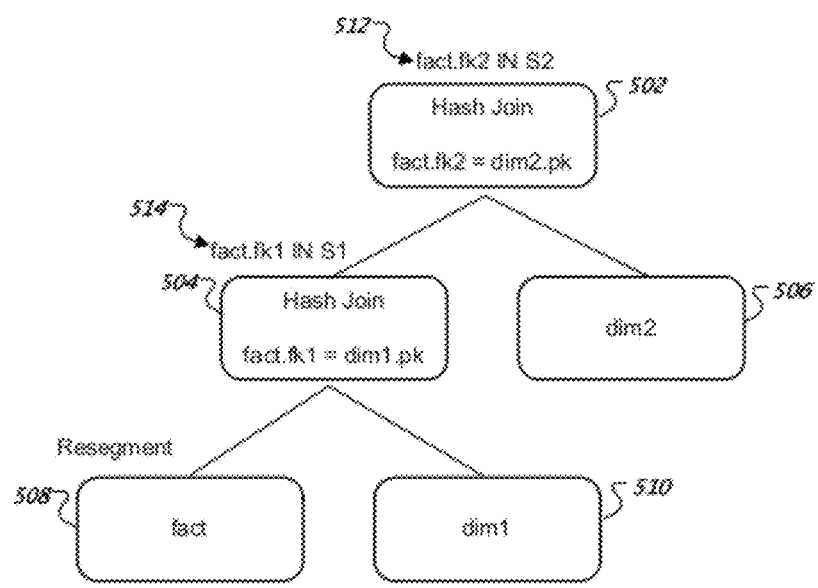
Figure 5C:
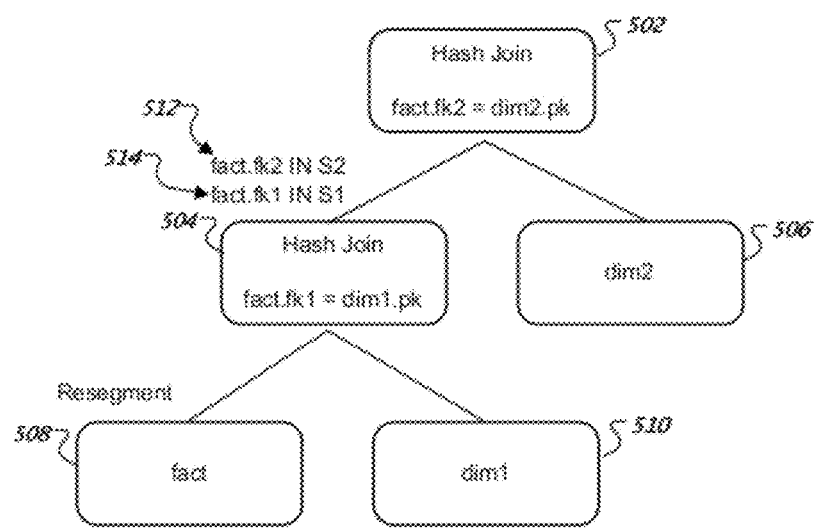

As shown in FIG. 5B, The optimizer 414 creates a SIP filter for each join operator. The join operator 502 has a SIP filter 512 "fact.fk2 IN S2" and the join operator 504 has a SIP filter 514 "fact.fk1 IN S1". The SIP filter data structures S1 and S2 are hash tables for tables "dim1" and "dim2", respectively. Initially, the SIP filters 512 and 514 are added to each join operator that they correspond to. Then, the push down process starts—the process attempts to push down the SIP filters 512 and 514 into the outer input of each respective join operator according to the rules described in TABLE 1 below.

TABLE 1

| | |
|---|---|
| Rule 1 | If the join is a left outer join or full outer join, then stop the push down process. |
| Rule 2 | If the outer input does not contain all the columns needed to evaluate the join's search condition, then stop the push down process. |
| Rule 3 | If the outer input to the join will be re-segmented, then stop the push down process. |

Continuing with the illustration, the process proceeds as follows. The SIP filter 512 "fact.fk2 IN S2" is pushed down to the outer input 504 of the join operator 502. This is allowed because the join operator 502 is an inner join (Rule 1). Also, "fact.fk2" will be available in the outer input (Rule 2), and there is no re-segmentation (Rule 3). The SIP filters 512 and 514 cannot be pushed down any further since the outer input 508 to the join operator 504 requires re-segmentation (Rule 3). If there were no re-segmentation, then the SIP filters 512 and 514 could be pushed down all the way to the scan of the "fact" table 508 (since that push down would satisfy all three rules).

Figure 6A:
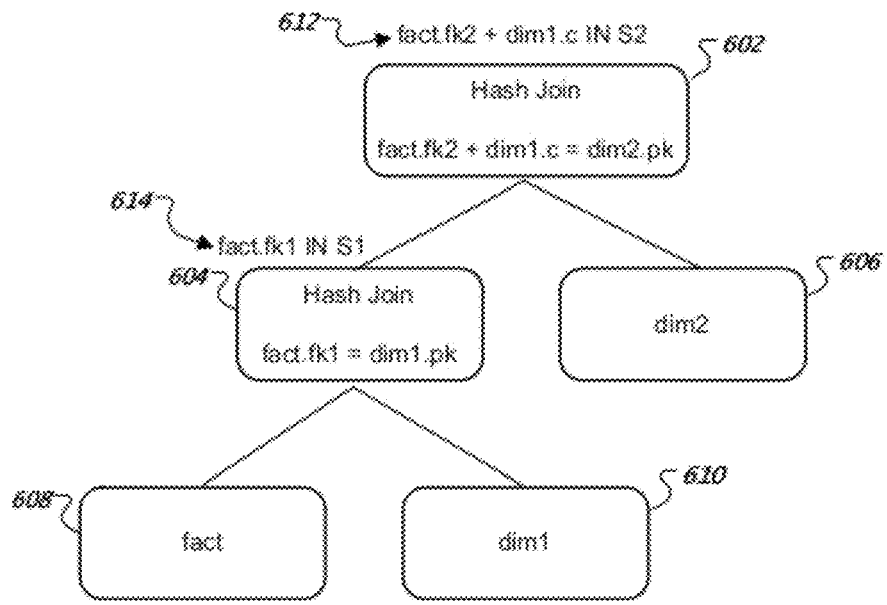
FIGS. 6A-6C illustrate another example SIP filter placement.

FIG. 6A illustrates a violation of Rule 2. The DAG in FIG. 6A includes two hash join operators: 602 and 604. The join operator 604 is for the search condition "fact.fk1=dim1.$pk$" and has an outer input 608 representing a scan of the "fact" table and an inner input 610 representing a scan of "dim1" table. The join operator 602 is for the search condition "fact.fk2+dim1.$c$=dim2.$pk$" and has an outer input which is the output of the join operator 604 and an inner input 606 which is a scan of table "dim2".

Figure 6B:
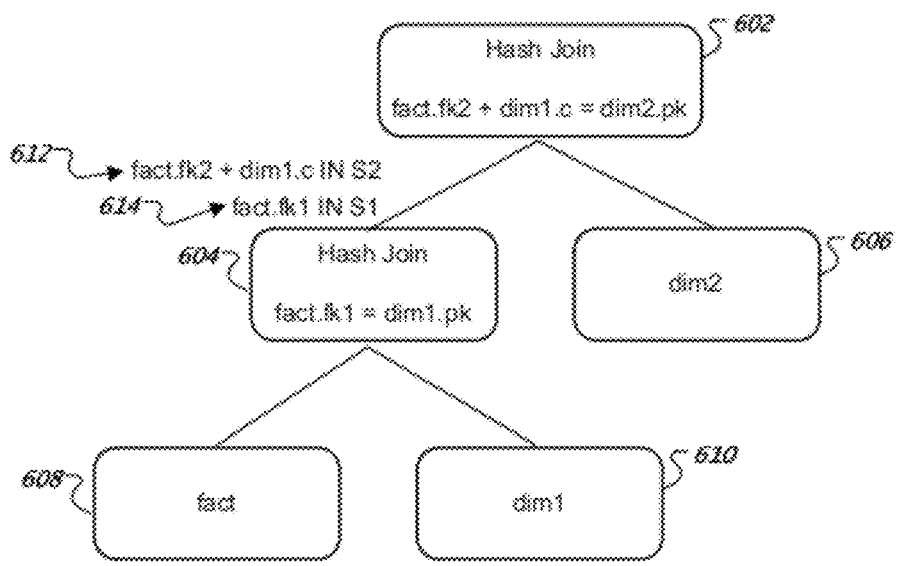
Figure 6C:
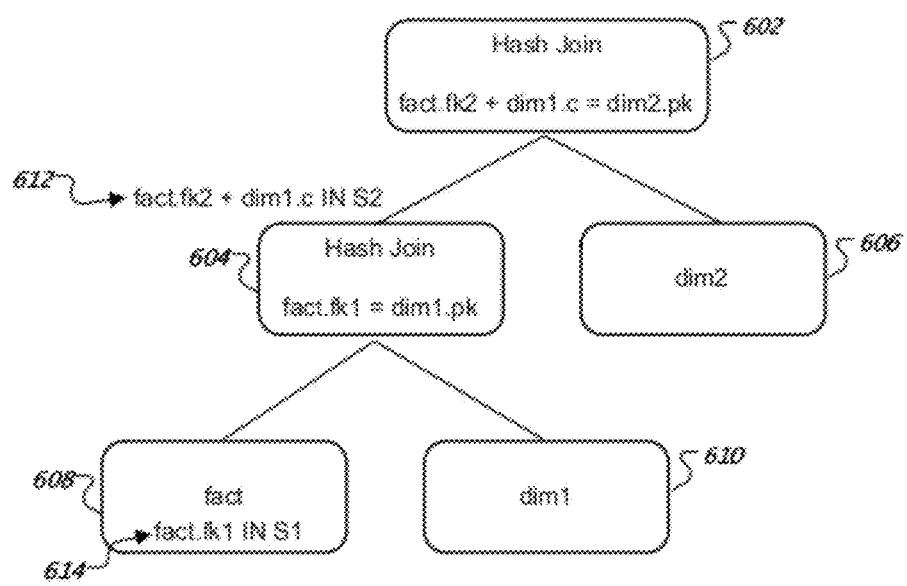

The SIP filter 612 can be pushed down to the outer input of the join operator 602, as shown in FIG. 6B since doing so would not violate any of the rules in TABLE 1. Similarly, the SIP filter 614 can be pushed down to the scan of table "fact" 608 (FIG. 6C). However, the SIP filter 612 cannot be pushed down any further, because the outer input 608 does not produce the value "dim1.$c$" (it comes from the inner input 610). Thus, at the end of the push down process, we may end up with a DAG that has SIP filters sprinkled all over. The SIP filters that end up on the table scan nodes can be the most useful since they filter out rows as early as possible in the query plan.

Figure 7A:
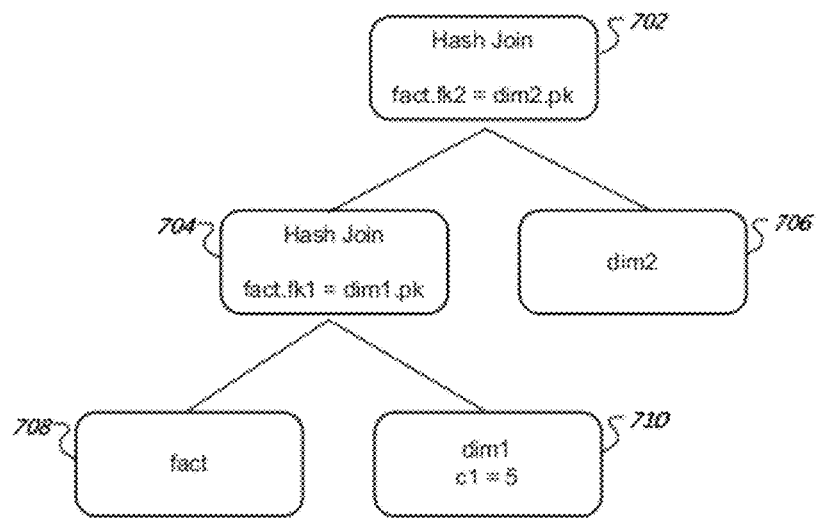
FIGS. 7A-7B illustrate an adaptive turning off feature for SIP filters.
Figure 7B:
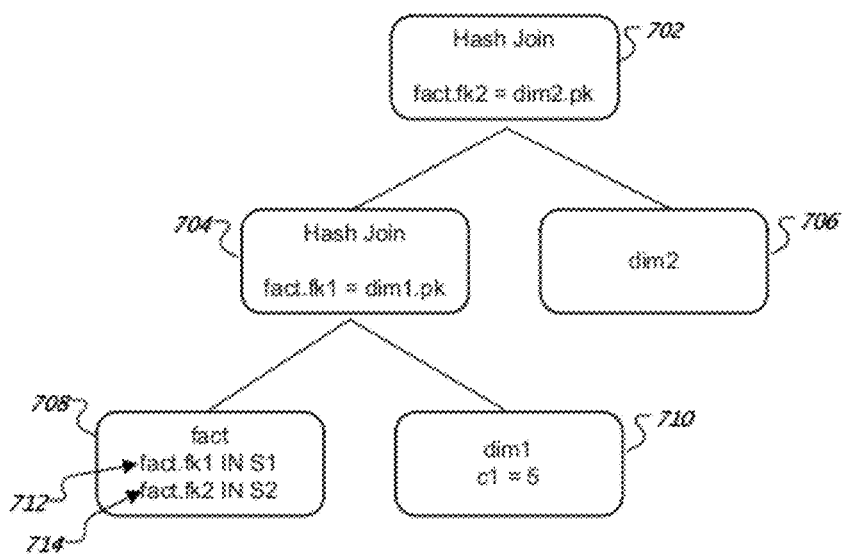

FIGS. 7A-7B illustrate an adaptive turning off feature for SIP filters. The DAG in FIG. 7A includes two hash join operators: 702 and 704. The join operator 704 is for the search condition "fact.fk1=dim1.pk" and has an outer input 708 representing a scan of the "fact" table and an inner input 610 representing a scan of "dim1" table. The join operator 702 is for the search condition "fact.fk2=dim2.pk" and has an outer input which is the output of the join operator 704 and an inner input 706 which is a scan of table "dim2". The DAG shown in FIG. 7A could be generated for the query:

SELECT * FROM fact JOIN dim1 on fk1=dim1.pk JOIN dim2 on fk2 = dim2.pk WHERE dim1.c1 = 5.

Note that there is no search condition predicate for the "dim2" table. Thus, the join operator 702 (between "fact" and "dim2") does not filter out any rows from table "dim2".

Let S1 and S2 denote the sideways information passing structures created by each of the joins (S1 is built by the join operator 704 between "fact" and "dim1", while S2 is built by the join operator 702 between "fact" and "dim2"). The data structures S1 and S2 could be hash tables, Bloom filters, or any other structure capturing information about the corresponding inner input to the join. As shown in FIG. 7B, the SIP filter creation and push-down algorithm will generate two SIP filters: SIP filter 712 "fact.fk1 IN S1" and SIP filter 714 "fact.fk2 IN S2". These SIP filters 712 and 714 will be pushed all the way down to the scan 708 on the "fact" table.

Since there is no search condition predicate on the table "dim2", the structure S2 of the SIP filter 714 will contain all of the values of the column "dim2.pk" column (e.g., in some encoded form). On the other hand, there is a search condition predicate on table "dim1", so structure S1 of the SIP filter 712 will contain only those values of column "dim1.pk" for which the corresponding value of the column "dim1.c1" is equal to 5. If it is assumed that the "fact.fk1" and "fact.fk2" columns are foreign keys to the tables "dim1" and "dim2", respectively, then all of the values appearing in the column "fact.fk1" will also appear in the column "dim1.pk", and all of the values appearing in the column "fact.fk2" also appear in the column "dim2.pk". Thus, the SIP filter 714 will not eliminate any rows from the "fact" table. However, the SIP filter 712 is likely to eliminate some rows, since S1 contains only those values of the "dim1.pk" column for which "dim.c1" is equal to the value 5. Hence, from the point of view of eliminating rows early, the SIP filter 714 is useless and only causes overhead. The overhead is of two types—a) the CPU processing overhead of actually evaluating the predicate for each row, and b) if the joins are late materialized, then the overhead of fetching the "fact.fk2" column earlier than needed.

To clarify point b) in the example above, if both joins are late materialized, the execution (without SIPS) proceeds as follows:

1.1 Fetch some number of values for column "fact.fk1".
1.2 Perform the join 704 of the table "fact" with the table "dim1".
1.3 Fetch column "fact.fk2" for only those rows that pass the join 704.
1.4 Perform the join 702 with the table "dim2".
1.5 Output all of the rows that pass the join operator 702.
1.6 Repeat steps 1.1-1.5 until there are no more rows in the "fact" table.

In the above scheme, if the first join 704 eliminates a large majority of rows of the "fact" table, then the "fact.fk2" column is fetched for only a small fraction of rows of the "fact" table. However, because the SIP filter 714 needs to be evaluated during the scan of the "fact" table (node 708 in FIG. 7B), then the "fact.fk2" column needs to be fetched for all rows in the "fact" table. Thus, the overhead of evaluating a useless SIP filter (e.g., filter 714) can be significant. In various implementations, this overhead can be prevented by adaptively stopping the evaluation of SIP filters that are deemed to be useless.

In various implementations, during the execution of a query plan a count of the number of rows that a given SIP filter has been evaluated on ($C_{total}$) so far is maintained, as is a count of the number of rows that the given SIP filter has eliminated ($C_{eliminated}$)—Once enough rows have been processed (e.g., once $C_{total}$ exceeds a certain threshold, 1000 for example), if $C_{eliminated}$ is less than a threshold fraction of $C_{total}$ (e.g., 5%), the given SIP filter is no longer evaluated. Moreover, the columns needed for evaluating the given SIP filter are no longer fetched. In the example above, this would proceed as follows:

2.1 Fetch some number of rows of the column "fact.fk1" and evaluate the SIP filter 712.
2.2 For rows that pass SIP filter 712 in step 2.1, fetch values from the column "fact.fk2" and evaluate the SIP filter 714.
2.3 Update the counts ($C_{total}$ and $C_{eliminated}$) for both SIP filters 712 and 714.
2.4 After evaluating the SIP filter 714 for 1000 rows, it is determined that $C_{eliminated}$ is equal to 0 (since in the example above, S2 has all the values of the column "dim2.pk"). Thus, evaluation of SIP filter 714 is stopped, and no more values of the column "fact.fk2" are fetched at this stage.
2.5 Perform the join operator 704.
2.6 Fetch the column "fact.fk2" for those rows that pass the join operator 704.
2.7 Perform the join operator 702.
2.8 Output rows that pass the join operator 702.
2.9 Repeat steps 2.1-2.8 until there are no more rows in the "fact" table.

By adaptively turning off the evaluation of the SIP filter 714, the CPU and disk overhead of step 2 can be eliminated. For early materialized joins, turning off the evaluation of useless SIP predicates may not save disk fetching, but it can save the CPU processing overhead.

The examples above show just one technique for determining when to turn off evaluation of a SIP filter. Other techniques are possible. For example, the overhead of evaluating a SIP filter can be measured and a threshold can be determined dynamically at run-time. Alternatively, a sampling approach can be used that tests the SIP filter for a wide sample of values from the SIP filter's table column and makes the decision based on those results. Another technique could be to turn on the SIP filter periodically and run the test and if the test indicates that the SIP filter is useless, the SIP filter can be turned off for a period of time or for a number of rows that are processed.

Figure 8:
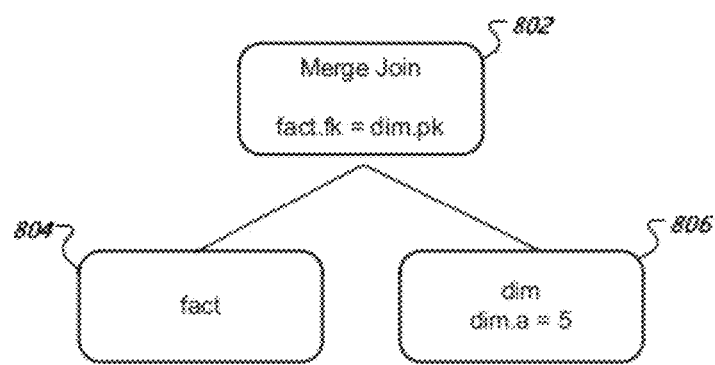
FIG. 8 illustrates SIP in the context of a merge join.

FIG. 8 illustrates SIP in the context of a merge join. A merge join requires that its inputs be sorted by the join attribute specified in the search condition. The DAG in FIG. 8 illustrates a merge join 802 between the tables "fact" 904 and "dim" 806 on the search condition "fact.fk=dim.pk". There is also an additional predicate "dim.a=5" in the search condition that has been pushed down to the dim table 806. Since this is a merge join, it is assumed that the "fact" table 804 is sorted on column "fact.fk" and that the "dim" table 806 is sorted on the column "dim.pk". Suppose the tables have the following values:

| DIM TABLE | | |
|---|---|---|
| pk | a | ... |
| 1 | 100 | |
| 2 | 25 | |
| 3 | 5 | |
| 4 | 35 | |
| 5 | 45 | |
| 6 | 5 | |
| 7 | 25 | |
| 8 | 100 | |
| 9 | 5 | |
| ... | | |

| FACT TABLE | |
|---|---|
| fk | ... |
| 1 | |
| 1 | |
| 1 | |
| ... | |
| 10 | |
| 10 | |
| 10 | |
| ... | |

The merge join operator 802 leads with the inner table (i.e., it first fetches a data block from the inner table). In this example, the fetched data will consist of only the bolded rows of the "dim" table shown above since those are the only rows that satisfy the search condition predicate "dim.a=5".

The join operator then constructs the following merge join SIP structure:

Minimum value: 3
Maximum value: 9
Hash table of "fact.pk" values the fetched rows This structure is the analogue of the hash table SIP structure in a hash join operator. A pointer to this merge join SIP structure is then passed to the outer input to the join (in the example above, this would be the scan of the "fact" table 804). The scan on "fact" table 804 proceeds as follows:

3.1 For the column "fact.fk", skip ahead in the fetched data to the minimum value in the merge join SIP structure (the value 3 in this case). The skip-ahead can be accomplished with a binary search since the column "fact.fk" is sorted, and hence does not require fetching all the disk data of the "fact.fk" column.

3.2 Start scanning the "fact.fk" column from the position found in step 3.1.

3.3 If the scanned value is less than or equal to the maximum value (9 in the example above), then look it up in the hash table of the merge join SIP structure. Output the scan value only if found in the hash table.

3.4 If the scanned value is greater than the maximum value (9 in this case), then output it without looking it up in the hash table of the merge join SIP.

3.5 Continue steps 3.3 and 3.4 until a set of values is produced.

For the example "fact" table shown above, the scan proceeds as follows:

4.1 Skip ahead in the fetched data to value 3 for the "fact.fk" column. Fetch all the rows for which "fact.fk" is equal to the value 3.

4.2 Fetch row with "fact.fk" is equal to 4. Since 4 is less than 9, we look it up in the hash table of the merge join SIP structure. Since the value 4 is not present, it is not output.

4.3 Repeat the above for all fetched rows with values 4 and 5 (since the value 5 is not in the hash table either).

4.4 Fetch a row with "fact.fk" equal to the value 6. The value 6 is in the hash table, so it is output. Similarly, all rows with "fact.fk" equal to the value 6 are tested and output.

4.5 Rows with "fact.fk" values of 7 and 8 are not output (similar to step 4.2 above), while rows with the value 9 are output (like step 4.4).

4.6 Fetch a row with "fact.fk" equal to the value 10. Because the 10 is greater than 9, it is output without having to look in the hash table.

Thus, the only rows from the outer flowing into the MergeJoin operator are rows with "fk" values 3, 6, 9 and 10. These are then used to perform the join, then another block of the inner table ("dim") is fetched, and the whole process repeats.

Figure 9:
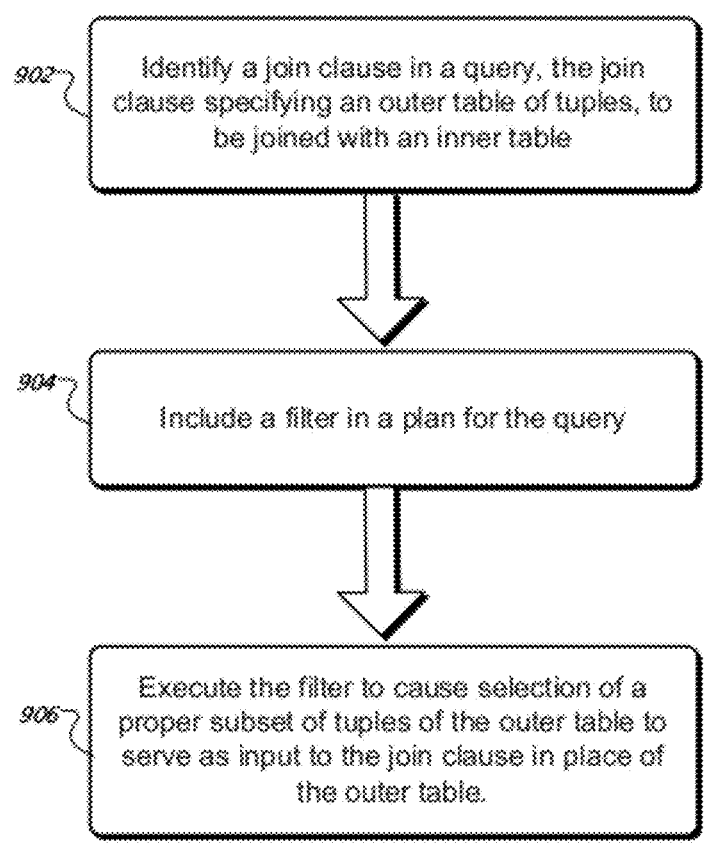
FIG. 9 is a flowchart illustrating an example technique for using SIP in a column store database.

FIG. 9 is an flow chart of an example technique for using SIP in a column store database. A join clause is identified in a query (902) by, for example, the optimizer 414. The join clause specifies an outer table of tuples, e.g., fact table 100, to be joined with an inner table, e.g., dim table 102. The outer table has one or more attributes. Each of the attributes' values are stored in an attribute file that is distinct from attribute files in which the values of other attributes are stored. Next, a filter, e.g., a hash or bloom filter, is included in a plan for the query (904). The filter is executed as part of plan execution (906). This causes a selection of a proper subset of tuples of the outer table to serve as input to the join clause in place of the outer table, in which selection of the tuples comprises reading a plurality of non-contiguous portions of an attribute file for one of the attributes without reading other portions of the attribute file and identifying attribute values in the read portions that satisfy one or more predicates applied to the inner table. That is, because columns are stored as sorted in separate files, filters can take advantage of container indexes to avoid reading blocks that would not contain values of interest.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    identifying, by a processor, a join clause in a query, the join clause specifying an outer table of tuples to be joined with an inner table, the join clause including an equality predicate equating a first attribute of the outer table to a second attribute of the inner table;
    in response to identifying the join clause in the query, the processor creating a hash table for second attribute values of inner table tuples using the first attribute of the outer table from the equality predicate that satisfies one or more predicates applied to the inner table;
    filtering, by the processor, each tuple of the outer table using the hash table to create a filtered subset of tuples of the outer table, wherein the filtering includes:
        storing values for the first attribute of the outer table in a dedicated attribute file as a sequence of blocks and according to a sort order, the dedicated attribute file having an index;
        utilizing the index and the sort order to read values from a plurality of non-contiguous portions of the dedicated attribute file that are necessary for the filtering, without reading other portions of the attribute file that are not necessary; and
        utilizing the values from the plurality of non-contiguous portions of the dedicated attribute file to create the filtered subset of tuples of the outer table; and
    performing, by the processor, a join operation to join the filtered subset of the outer table to the inner table, the join operation corresponding to the join clause in the query.

2. The method of claim 1, wherein each of the attributes of the outer table is a run-length encoded attribute.

3. The method of claim 1, the inner table having a second set of attributes, each of the second set of attributes of the inner table having attribute values stored in an attribute file that is distinct from attribute files in which the values of other attributes of the second set are stored.

4. The method of claim 3, further comprising:
    determining a maximum value of the second set of attributes of the inner table; and
    selecting one or more tuples of the outer table having attribute values that are less than the determined maximum value and that are in the hash table.

5. The method of claim 1, further comprising generating a query plan to execute the query, the query plan including a creation of the hash table.

6. The method of claim 1, wherein the filtering is configured to adaptively stop if a threshold condition is met.

7. A computing device comprising:
    a processor;
    a non-transitory storage medium storing instructions executable by the processor to:
        identify a join clause in a query, the join clause specifying an outer table of tuples to be joined with an inner table, the join clause including an equality predicate equating a first attribute of the outer table to a second attribute of the inner table;
        in response to identifying the join clause in the query, create a hash table for second attribute values of inner table tuples using the first attribute of the outer table from the equality predicate that satisfies one or more predicates applied to the inner table;
        filter each tuple of the outer table using the hash table to create a filtered subset of tuples of the outer table, wherein to filter each tuple, the instructions are further executable to:
            store values for the first attribute of the outer table in a dedicated attribute file as a sequence of blocks and according to a sort order, the dedicated attribute file having an index;
            utilize the index and the sort order to read values from a plurality of non-contiguous portions of the dedicated attribute file that are necessary for the filtering, without reading other portions of the attribute file that are not necessary; and
            utilize the values from the plurality of non-contiguous portions of the dedicated attribute file to create the filtered subset of tuples of the outer table; and
        perform a join operation to join the filtered subset of the outer table to the inner table, the join operation corresponding to the join clause in the query.

8. The computing device of claim 7, wherein each of the attributes of the outer table is a run-length encoded attribute.

9. The computing device of claim 7, the inner table having a second set of attributes, each of the second set of attributes of the inner table having attribute values stored in an attribute file that is distinct from attribute files in which the values of other attributes of the second set are stored.

10. The computing device of claim 9, the instructions further executable to:
    determine a maximum value of the second set of attributes of the inner table; and
    select one or more tuples of the outer table having attribute values that are less than the determined maximum value and that are in the hash table.

11. The computing device of claim 7, the instructions further executable to:
    generate a query plan to execute the query, the query plan including a creation of the hash table.

12. The method of claim 7, wherein the filtering is configured to adaptively stop if a threshold condition is met.

13. An article comprising a non-transitory storage medium storing instructions that upon execution cause a processor to:

identify a join clause in a query, the join clause specifying an outer table of tuples to be joined with an inner table, the join clause including an equality predicate equating a first attribute of the outer table to a second attribute of the inner table;

in response to identifying the join clause in the query, create a hash table for second attribute values of inner table tuples using the first attribute of the outer table from the equality predicate that satisfies one or more predicates applied to the inner table;

filter each tuple of the outer table using the hash table to create a filtered subset of tuples of the outer table, wherein to filter each tuple, the instructions are further executable to:
  store values for the first attribute of the outer table in a dedicated attribute file as a sequence of blocks and according to a sort order, the dedicated attribute file having an index;
  utilize the index and the sort order to read values from a plurality of non-contiguous portions of the dedicated attribute file that are necessary for the filtering, without reading other portions of the attribute file that are not necessary; and
  utilize the values from the plurality of non-contiguous portions of the dedicated attribute file to create the filtered subset of tuples of the outer table; and perform a join operation to join the filtered subset of the outer table to the inner table, the join operation corresponding to the join clause in the query.

14. The article of claim 13, wherein each of the attributes of the outer table is a run-length encoded attribute.

15. The article of claim 13, the inner table having a second set of attributes, each of the second set of attributes of the inner table having attribute values stored in an attribute file that is distinct from attribute files in which the values of other attributes of the second set are stored.

16. The article of claim 15, the instructions further executable to:
  determine a maximum value of the second set of attributes of the inner table; and
  select one or more tuples of the outer table having attribute values that are less than the determined maximum value and that are in the hash table.

17. The article of claim 13, the instructions further executable to:
  generate a query plan to execute the query, the query plan including a creation of the hash table.

18. The method of claim 13, wherein the filtering is configured to adaptively stop if a threshold condition is met.

* * * * *